United States Patent
Lee et al.

(10) Patent No.: US 10,230,933 B2
(45) Date of Patent: Mar. 12, 2019

(54) PROCESSING THREE-DIMENSIONAL (3D) IMAGE THROUGH SELECTIVELY PROCESSING STEREOSCOPIC IMAGES

(71) Applicant: Samsung Electronics Co., Ltd., Suwon-si, Gyeonggi-do (KR)

(72) Inventors: Seok Lee, Hwaseong-si (KR); Dong Il Han, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 15/189,541

(22) Filed: Jun. 22, 2016

(65) Prior Publication Data

US 2017/0161941 A1    Jun. 8, 2017

(30) Foreign Application Priority Data

Dec. 3, 2015  (KR) .................. 10-2015-0171357

(51) Int. Cl.
| | | |
|---|---|---|
| *H04N 13/117* | (2018.01) | |
| *H04N 13/106* | (2018.01) | |
| *H04N 13/111* | (2018.01) | |
| *G06T 15/00* | (2011.01) | |
| *H04N 13/02* | (2006.01) | |

(52) U.S. Cl.
CPC ......... *H04N 13/117* (2018.05); *G06T 15/005* (2013.01); *H04N 13/0278* (2013.01); *H04N 13/106* (2018.05); *H04N 13/111* (2018.05); *H04N 2213/007* (2013.01)

(58) Field of Classification Search
CPC ....... G06T 15/20; G06T 15/205; G06T 7/593; G06T 15/005; H04N 13/0014; H04N 13/0018; H04N 13/0402–13/042; H04N 13/0484; H04N 13/106; H04N 13/111; H04N 13/117; H04N 2213/007
See application file for complete search history.

(56) References Cited

U.S. PATENT DOCUMENTS

| | | | |
|---|---|---|---|
| 6,111,597 A * | 8/2000 | Tabata | G02B 27/2264 345/8 |
| 8,797,324 B2 | 8/2014 | Mora | |
| 8,817,015 B2 | 8/2014 | Georgiev et al. | |
| 2002/0122585 A1* | 9/2002 | Swift | H04N 7/17318 382/154 |

(Continued)

FOREIGN PATENT DOCUMENTS

| | | |
|---|---|---|
| CN | 104427325 A | 3/2015 |
| KR | 20130131480 A | 12/2013 |

OTHER PUBLICATIONS

Mueller, Karsten, et al. "View synthesis for advanced 3D video systems." EURASIP Journal on image and video processing 2008.1 (2009): 438148.*

(Continued)

*Primary Examiner* — Daniel F Hajnik
(74) *Attorney, Agent, or Firm* — Harness, Dickey & Pierce, P.L.C.

(57) ABSTRACT

An apparatus for creating a three-dimensional (3D) image may create stereoscopic images based on an input image, and may create a 3D image by performing 3D rendering based on detected eye position information of a user and the stereoscopic images.

16 Claims, 14 Drawing Sheets

(56) References Cited

U.S. PATENT DOCUMENTS

| | | | | |
|---|---|---|---|---|
| 2007/0122027 A1* | 5/2007 | Kunita | .................... | G06T 7/593 |
| | | | | 382/154 |
| 2008/0007559 A1 | 1/2008 | Kalaiah et al. | | |
| 2011/0273437 A1* | 11/2011 | Sanderson | ......... | H04N 13/0497 |
| | | | | 345/419 |
| 2012/0188335 A1* | 7/2012 | Lee | .......................... | H04N 7/24 |
| | | | | 348/43 |
| 2012/0249736 A1* | 10/2012 | Barrett | ............... | H04N 13/0029 |
| | | | | 348/43 |
| 2014/0146124 A1* | 5/2014 | Jang | ................... | H04N 13/0497 |
| | | | | 348/14.03 |
| 2014/0192053 A1 | 7/2014 | Bi et al. | | |
| 2014/0347363 A1 | 11/2014 | Kaburlasos | | |
| 2015/0035953 A1* | 2/2015 | Bredehoft | .......... | H04N 13/0018 |
| | | | | 348/51 |
| 2015/0084949 A1 | 3/2015 | Venkatesh et al. | | |
| 2016/0080719 A1* | 3/2016 | Tsukagoshi | ........ | H04N 13/0011 |
| | | | | 348/46 |
| 2016/0156902 A1 | 6/2016 | Lee et al. | | |

OTHER PUBLICATIONS

Devernay, Frédéric, Sylvain Duchêne, and Adrian Ramos-Peon. "Adapting stereoscopic movies to the viewing conditions using depth-preserving and artifact-free novel view synthesis." SD&A 2011—Stereoscopic Displays and Applications XXII. vol. 7863. SPIE and IS&T, 2011.*

Krüger et. al. "Acceleration Techniques for GPU-based Volume Rendering." 2003.

* cited by examiner

PROCESSING THREE-DIMENSIONAL (3D) IMAGE THROUGH SELECTIVELY PROCESSING STEREOSCOPIC IMAGES

CROSS-REFERENCE TO RELATED APPLICATION

This application claims under 35 U.S.C. § 119 to Korean Patent Application No. 10-2015-0171357, filed on Dec. 3, 2015, in the Korean Intellectual Property Office, the entire contents of which are incorporated herein by reference in its entirety.

BACKGROUND

1. Field

At least one example embodiment relates to a method and/or an apparatus for creating a three-dimensional (3D) image, and more particularly, to a method and/or an apparatus for detecting an eye position of a user and creating a 3D image corresponding to eye position information.

2. Description of the Related Art

In general, a three-dimensional (3D) image may be provided using a glass-type method and a glass-free type method. In the case of providing a 3D image using the glass-free type method, a left-eye image and a right-eye image may be provided to a left eye and a right eye, respectively. Positions of the left eye and the right eye may be required to provide the left-eye image and the right-eye image. Positions of the left eye and the right eye are detected, and a 3D image is provided based on the detected positions. If the positions of the left eye and the right area vary while creating the 3D image, a user may view a slightly distorted or degraded 3D image.

SUMMARY

Some example embodiments relate to a graphics processing unit (GPU).

In some example embodiments, the GPU may include a panel renderer configured to acquire stereoscopic images, and a fragment shader configured to create an executable three-dimensional (3D) image by performing 3D rendering based on eye position information detected from a first image and the stereoscopic images. The eye position information is acquired from a central processing unit (CPU) connected to the GPU.

The stereoscopic images may be processed through different pipelines based on an attribute of a second image.

When the second image is graphics data, the stereoscopic images may be created based on the graphics data and motion parallax.

The GPU may be configured to create the stereoscopic images by setting two camera views on a graphics space, by creating two images based on the graphics data and the set two camera views, and by converting the two images to preset (or alternatively, desired) size images.

When the second image includes different view images, the stereoscopic images may be created by converting the different view images to the preset (or alternatively, desired) size images, respectively.

The GPU may be configured to map the different view images to panels within a graphics space, respectively, to set camera views corresponding to the panels on the graphics space, and to create the stereoscopic images based on the panels and the camera views.

When the second image is a frame of a 3D video, the stereoscopic images may be created by segmenting the frame into two images and by converting the two images to preset (or alternatively, desired) size images, respectively.

The fragment shader may be further configured to perform the 3D rendering by mapping pixel values of the stereoscopic images to a single image.

The fragment shader may be further configured to perform the 3D rendering using a panel of an open graphics library.

The fragment shader may be further configured to perform the 3D rendering using a display parameter of an external display on which the 3D image is to be displayed.

The GPU may further include a frame buffer configured to buffer the 3D image and to display the 3D image on an external display.

Some example embodiments relate to a 3D image processing method performed at a GPU.

In some example embodiments, the 3D image processing method may include acquiring stereoscopic images, and creating an executable 3D image by performing 3D rendering based on eye position information detected from a first image and the stereoscopic images. The eye position information is acquired from a CPU.

The stereoscopic images may be processed through different pipelines based on an attribute of a second image.

The creating of the 3D image may include performing the 3D rendering by mapping pixel values of the stereoscopic images to a single image.

The 3D image processing method may further include buffering the 3D image and displaying the 3D image on an external display.

Some example embodiments relate to a 3D image processing apparatus.

In some example embodiments, the 3D image processing apparatus may include a first processor configured to detect eye position information of a user from a first image, and a second processor configured to acquire stereoscopic images, and to create an executable 3D image by performing 3D rendering based on the eye position information and the stereoscopic images.

The first processor may be a CPU, and the second processor may be a GPU.

The second processor may be further configured to buffer the 3D image and to display the 3D image on an external display.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
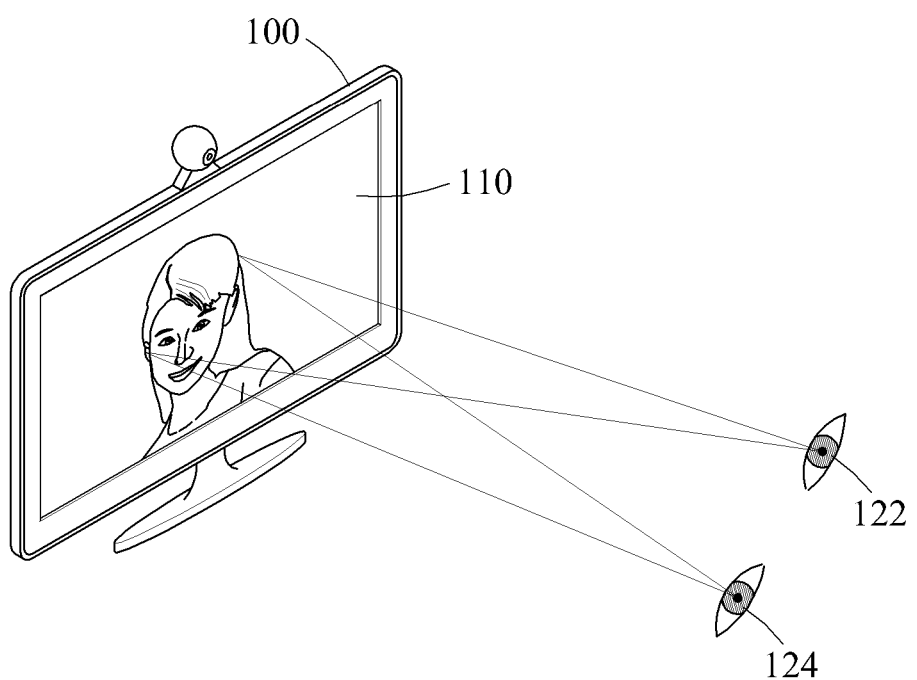
FIG. 1 illustrates a concept of a view tracking display method according to at least one example embodiment.

Inventive concepts will now be described more fully with reference to the accompanying drawings, in which example embodiments of are shown. These example embodiments are provided so that this disclosure will be thorough and complete, and will fully convey inventive concepts of to those skilled in the art. Inventive concepts may be embodied in many different forms with a variety of modifications, and a few embodiments will be illustrated in drawings and explained in detail. However, this should not be construed as being limited to example embodiments set forth herein, and rather, it should be understood that changes may be made in these example embodiments without departing from the principles and spirit of inventive concepts, the scope of which are defined in the claims and their equivalents. Like numbers refer to like elements throughout. In the drawings, the thicknesses of layers and regions are exaggerated for clarity.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Specific details are provided in the following description to provide a thorough understanding of example embodiments. However, it will be understood by one of ordinary skill in the art that example embodiments may be practiced without these specific details. For example, systems may be shown in block diagrams so as not to obscure example embodiments in unnecessary detail. In other instances, well-known processes, structures and techniques may be shown without unnecessary detail in order to avoid obscuring example embodiments.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "includes", "including", "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device.

The plurality of device structures may be arranged in an array and/or in a two-dimensional pattern.

Unless otherwise defined, all terms (including technical and scientific terms) used herein have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Expressions such as "at least one of," when preceding a list of elements, modify the entire list of elements and do not modify the individual elements of the list.

FIG. 1 illustrates a concept of a view tracking display method according to at least one example embodiment.

A display device 100 may display an image 110 based on detected eye positions 122 and 124 of a user. For example, the display device 100 may render the image 110 to be three-dimensionally displayed at the eye positions 122 and 124. The image 110 may include a two-dimensional (2D) image, a 2D video, different view images, a 3D video, and graphics data. For example, the image 110 may relate to 3D, however, should not be construed as limited thereto. The different view images may be a left-eye image and a right-eye image, and may be stereoscopic images. The 3D video may include a plurality of frames, and each frame may include images associated with a plurality of views. The graphics data may include information about a 3D model represented on a graphics space.

When the display device 100 includes a video processing device, the video processing device may render the image 110. For example, the video processing device may be one of a graphic card, a graphics accelerator, and a video graphics array (VGA) card. A method of rendering an image using the video processing device will be described with reference to FIGS. 2 through 14.

Figure 2:
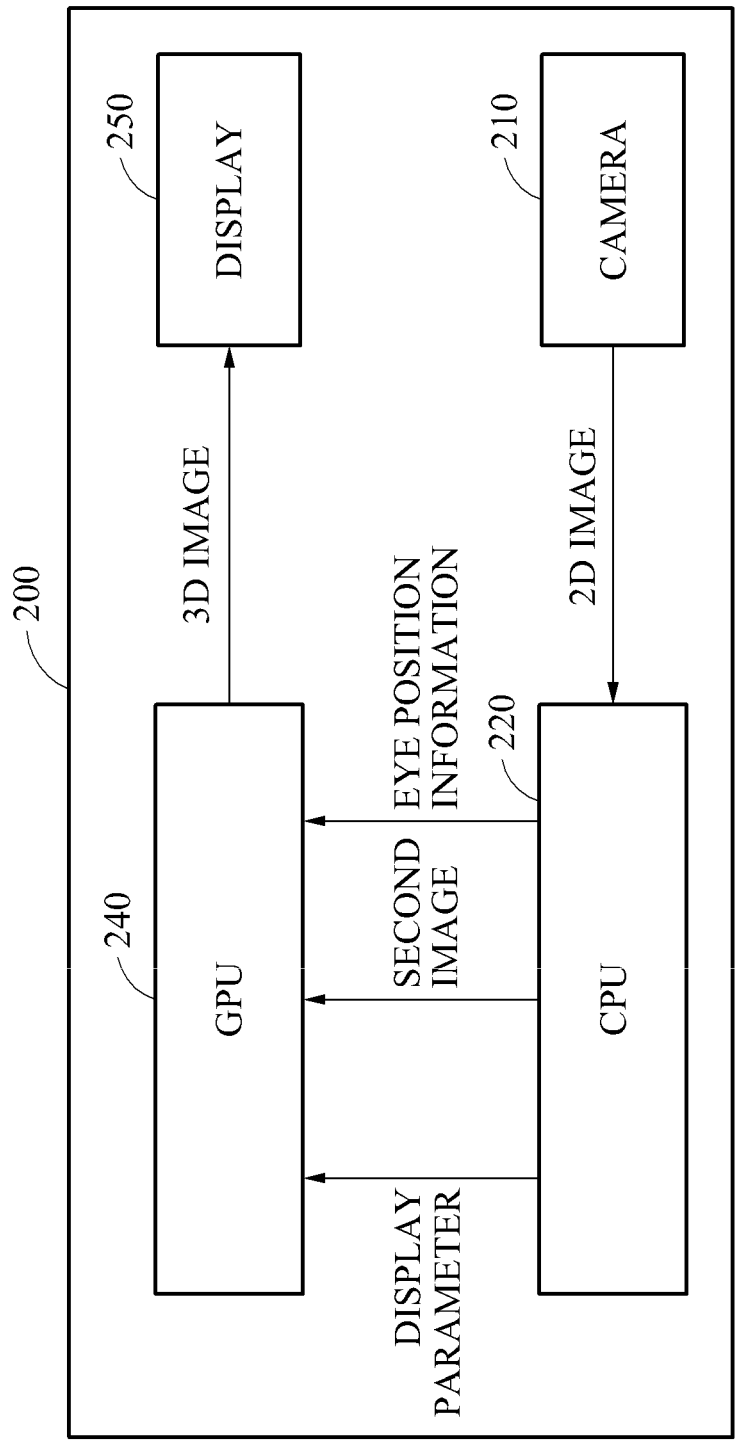
FIG. 2 is a block diagram illustrating an example of a display device according to at least one example embodiment.

FIG. 2 is a block diagram illustrating an example of a display device according to at least one example embodiment.

Referring to FIG. 2, a display device 200 may include a camera 210, a central processing unit (CPU) 220, a graphics processing unit (GPU) 240, and a display 250.

The camera 210 may photograph an object ahead of or around the display device 200.

The CPU 220 may detect an eye position of a user using a first image photographed at the camera 210. The first image may be referred to as a user image. A method of detecting the eye position of the user will be described with reference to FIG. 11.

The CPU 220 may include a memory and may store the detected eye position in the memory. A second image may be stored in the memory. For example, different view images to be processed and/or a 3D video may be stored in the memory. The second image may be content for viewing on the display. A display parameter may be stored in the memory. The display parameter may include a brightness of a pixel, a contrast, a pitch of a color, a slanted angle, a barrier slit pitch, and/or a slit start position.

The eye position of the user, the second image, and the display parameter may be transmitted from the CPU 220 to the GPU 240.

The GPU 240 may create a third image by rendering the second image based on eye position information. For example, third image may be a 3D image and the display 250 may output the third image. The GPU 240 may include a processor and a memory with computer readable instructions for causing the processor to carry out at least one operation according to example embodiments. To distinguish the CPU 220 and the GPU 240 from each other, the CPU 220 may be referred to as a first processor and the GPU 240 may be referred to as a second processor.

Although FIG. 2 illustrates that the camera 210, the CPU 220, the GPU 240, and the display 250 are included in the display apparatus 200, each of the camera 210, the CPU 220, the GPU 240, and the display 250 may be provided as a separate device. Examples of the camera 210, the CPU 220, the GPU 240, and the display 250 will be described with reference to FIGS. 12 through 14.

Figure 3:
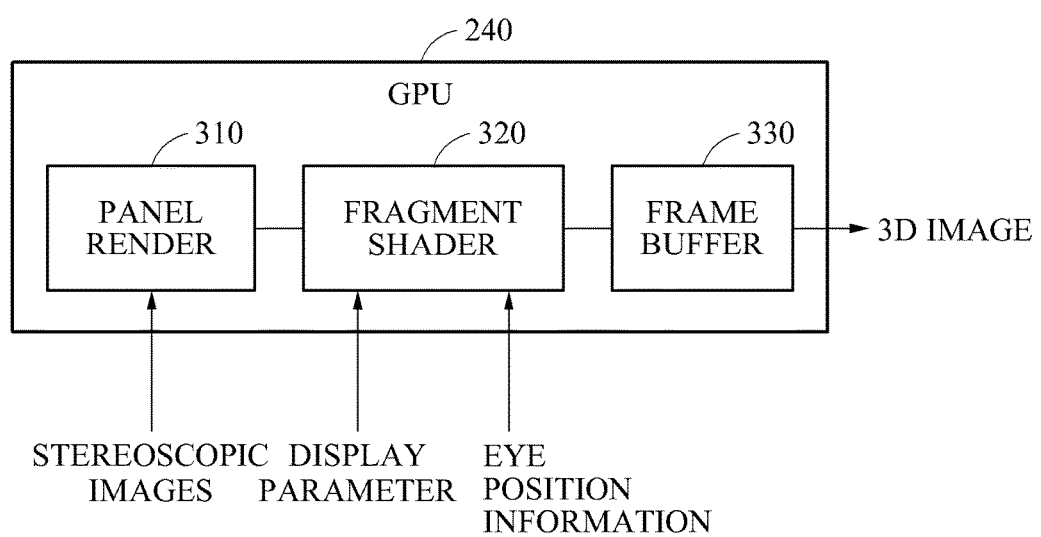
FIG. 3 is a block diagram illustrating an example of a graphics processing unit (GPU) according to at least one example embodiment.

FIG. 3 is a block diagram illustrating an example of a GPU according to at least one example embodiment.

Referring to FIG. 3, a GPU 240 may include a panel renderer 310, a fragment shader 320, and a frame buffer 330.

The panel renderer 310 may acquire stereoscopic images. For example, the GPU 240 may create stereoscopic images based on a second image. When the second image includes stereoscopic images, the panel renderer 310 may receive input stereoscopic images.

The fragment shader 320 may perform 3D rendering based on the stereoscopic images and eye position information of a user. For example, the fragment shader 320 may perform 3D rendering using a display parameter. A 3D image may be created as a result of 3D rendering.

The frame buffer 330 may buffer the 3D image and may send the buffered 3D image to an external display.

Figure 4:
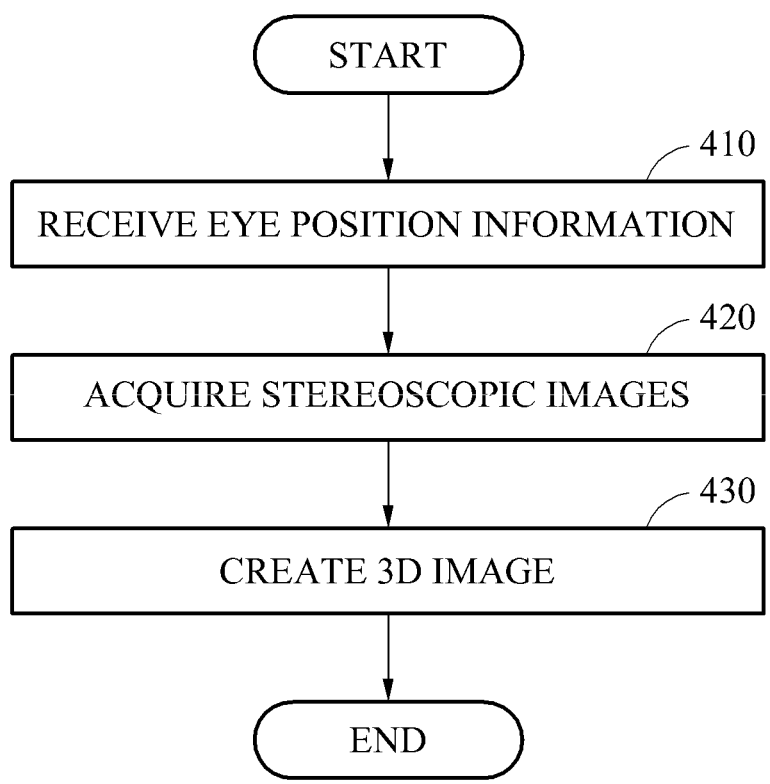
FIG. 4 is a flowchart illustrating a method of creating a three-dimensional (3D) image according to at least one example embodiment.

FIG. 4 is a flowchart illustrating a method of creating a 3D image according to at least one example embodiment.

The 3D image rendering method may be performed by the GPU 240 of FIG. 3.

In operation 410, eye position information detected at the CPU 220 may be received.

In operation 420, stereoscopic images may be acquired. For example, stereoscopic images stored in a memory may be acquired. The memory may be included in the GPU 240 and may include a texture buffer.

In one example, the stereoscopic images may be created by the CPU 220 of FIG. 2 or the GPU 240 of FIG. 2. For example, the stereoscopic images may be created using different methods based on an attribute of a second image. The different methods may be different pipelines. That is, the stereoscopic images may be processed through the different pipelines based on the attribute of the second image. An attribute of the second image may refer to a form of the second image. For example, the second image may be in the form of graphics data, different view images, or a frame of 3D video data.

A method of creating stereoscopic images based on an attribute of a second image will be further described with reference to FIGS. 5 through 9.

Although FIG. 4 illustrates that operation 420 is performed after performing operation 410, operation 410 may be performed after performing operation 420. Alternatively, operations 410 and 420 may be performed in parallel.

In operation 430, an executable 3D image may be created by performing 3D rendering based on the eye position information and the stereoscopic images. Here, the executable 3D image may refer to an image that may be output, for example, displayed using a display device. For example, the 3D image may be created by performing 3D rendering based on pixel information of the stereoscopic images. 3D rendering may be performed so that the 3D image may be displayed at an eye position of the user based on eye position information. The rendered 3D image may be stored in the frame buffer 330.

The GPU 240 may perform 3D rendering by mapping pixels of the stereoscopic images to a single image base on eye position information and a display parameter.

A method of creating a 3D image will be described with reference to FIG. 10.

The GPU 240 may perform operations 420 and 430 independently. Operations 420 and 430 may be understood as the respective independent pipelines.

Figure 5:
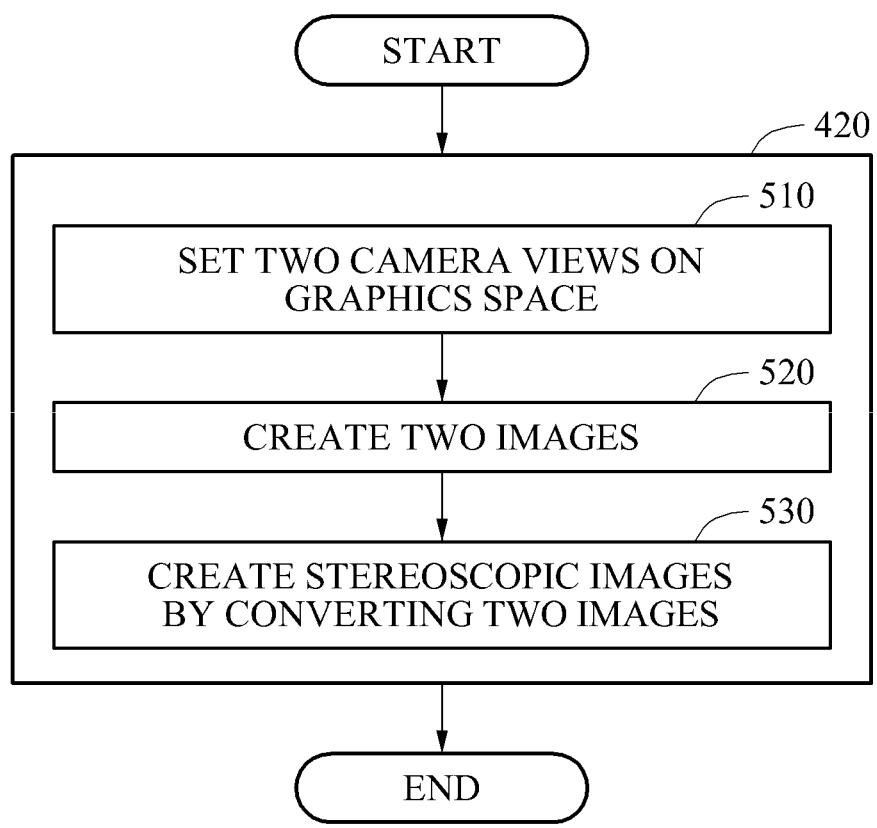
FIG. 5 is a flowchart illustrating a method of creating stereoscopic images when a second image is graphics data according to at least one example embodiment.

FIG. 5 is a flowchart illustrating a method of creating stereoscopic images when a second image is graphics data according to at least one example embodiment.

Operation 420 may include operations 510 through 530. Operations 510 through 530 may be performed when the second image is graphics data. In operation 510, two camera views may be created or alternatively, set on a graphics space. The graphics space may refer to a virtual space represented using the graphics data.

In operation 520, two images may be created based on the graphics data and the two camera views. For example, two images may be created by virtually photographing the graphics space at the two camera views. Two images may be created to represent motion parallax about the two camera views based on detected eye positions of the user.

In operation 530, stereoscopic images may be created by converting the two images to size images (e.g., preset size images). For example, the stereoscopic images may be created using an open graphics library (GL).

When the second image is graphics data, the stereoscopic images may be created based on the graphics data and the motion parallax through operations 510 through 530. Operations 510 through 530 may be understood as a single pipeline performed by the GPU 240. Operations 510 through 530 may be referred to as a graphics pipeline.

Figure 6:
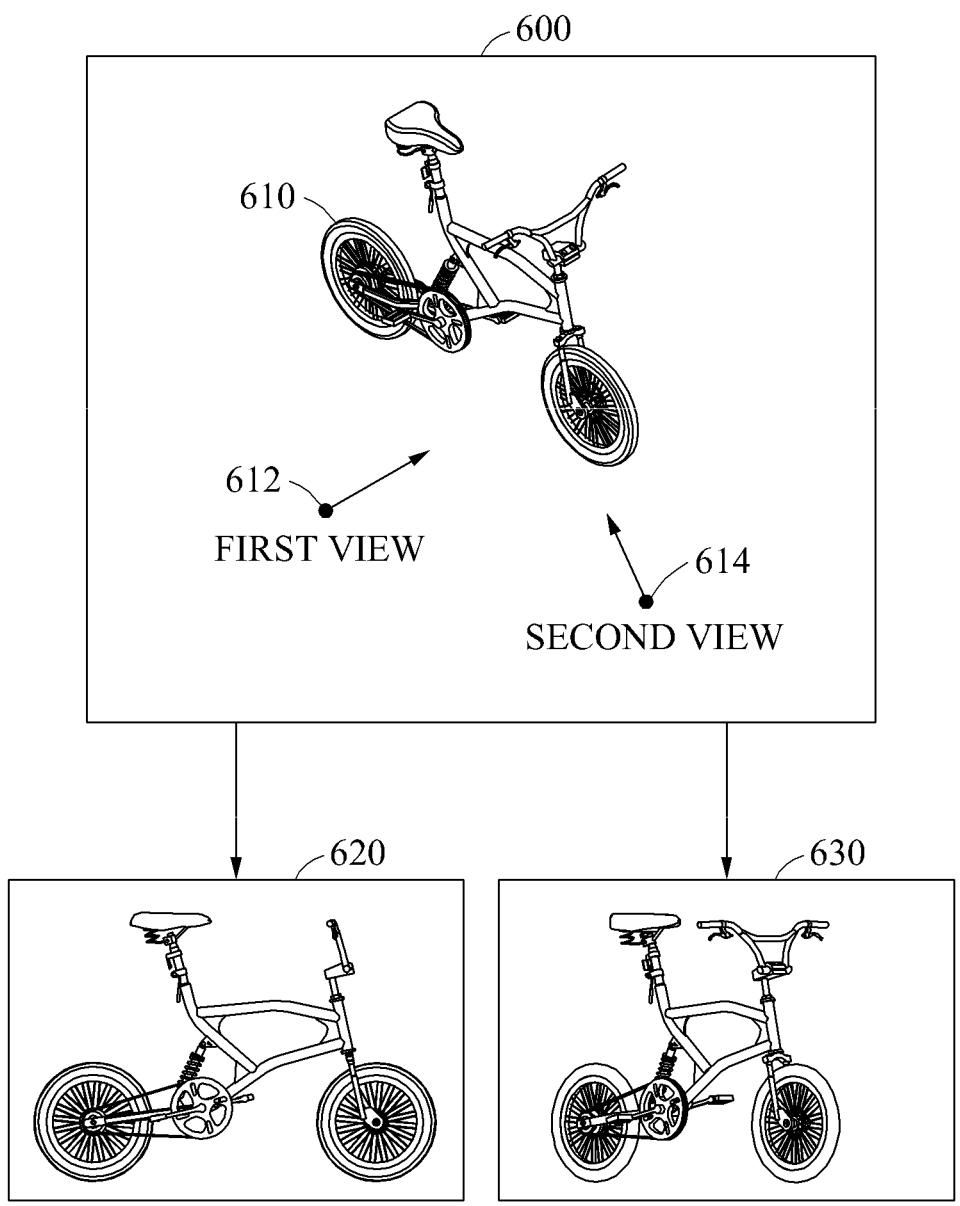
FIG. 6 illustrates an example of creating two images when a second image is graphics data according to at least one example embodiment.

FIG. 6 illustrates an example of creating two images created when a second image is graphics data according to at least one example embodiment.

A graphics space 600 of graphics data may include a 3D model 610. Although the 3D model 610 is provided as an object, for example, a bicycle, the graphics space 600 may be a virtual reality space. The virtual reality space may include an object and a surrounding environment of the object.

The GPU 240 may set two camera views, for example, a first view 612 and a second view 614, on the graphics space 600. The set two camera views, for example, the first view 612 and the second view 614, may correspond to detected eye positions of the user and may be desired (or alternatively, predetermined) views different from eye positions of a user, respectively. For example, the first view 612 may be a front view of the 3D model 610 and the second view 614 may be a side view of the 3D model 610.

The GPU 240 may create a first view image 620 by photographing the graphics space 600 at the first view 612 and may create a second view image 630 by photographing the graphics space 600 at the second view 614. The GPU 240 may create the first view image 620 and the second view image 630 based on a desired (or alternatively, preset) size. The desired (or alternatively, preset) size may be a size of an image to be displayed. For example, when the size of the image to be displayed is 3840×2160, the first view image 620 and the second view image 630 may be created to have a size of 3840×2160.

Figure 7:
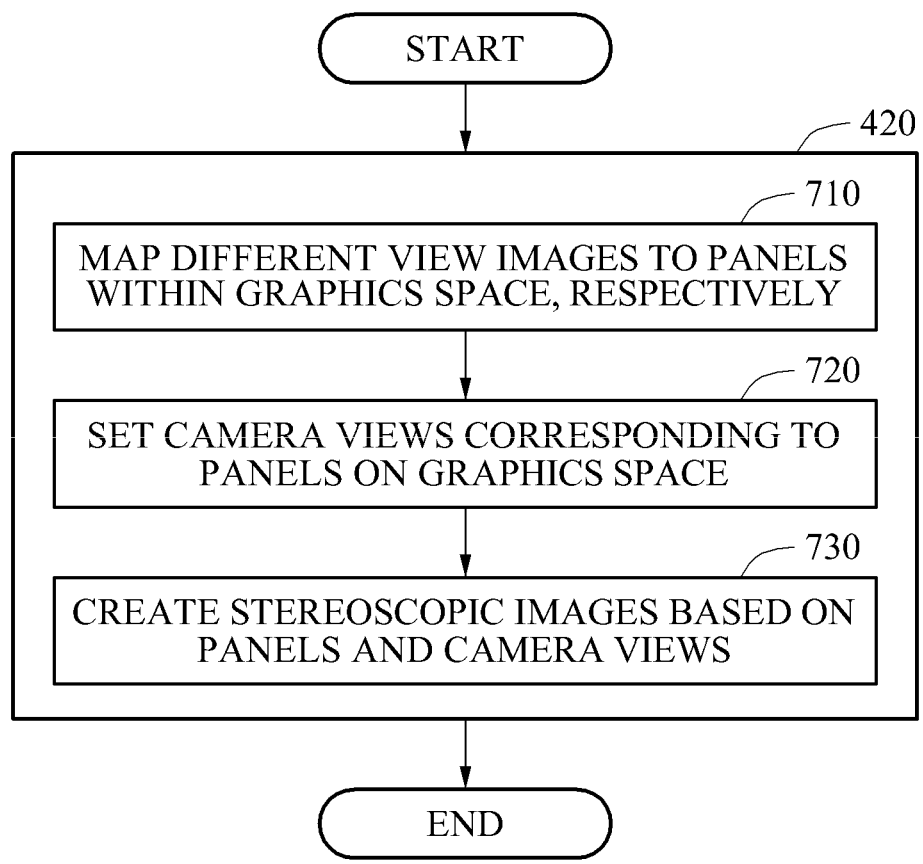
FIG. 7 is a flowchart illustrating a method of creating stereoscopic images when a second image includes different view images according to at least one example embodiment.

FIG. 7 is a flowchart illustrating a method of creating stereoscopic images when a second image includes different view images according to at least one example embodiment.

Operation 420 may include operations 710 through 730. Operations 710 through 730 may be performed when the second image includes different view images. When the second image includes different view images, stereoscopic images may be created by converting the different view images to desired (or alternatively, preset) size images, respectively. Operations 710 through 730 may be performed by the GPU 240.

In operation 710, the different view images may be mapped to panels within a graphics space, respectively. The graphics space may be a virtual space, and each of the panels may correspond to a 2D image captured from the graphics space at a specific view. A panel may be a panel of an open GL. A texture may be set to the panel using the different view images.

In operation 720, camera views corresponding to the panels may be set on the graphics space. A camera view may be set so that a different view image, for example, a left-eye image set to a panel may fill a view of a camera.

In operation 730, the stereoscopic images may be created based on the panels and the camera views. The stereoscopic images may be created by photographing the panels at the camera views. The stereoscopic images may be created to have a desired (alternatively, preset) size. For example, the desired (or alternatively, preset) size may be a size of an image to be displayed.

Figure 8:
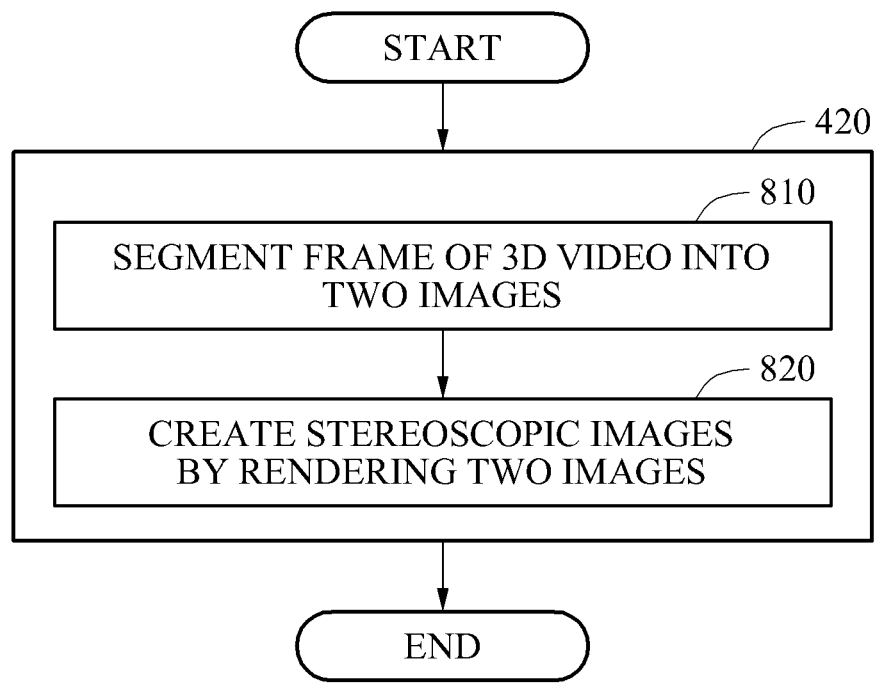
FIG. 8 is a flowchart illustrating a method of creating stereoscopic images when a second image is a 3D video according to at least one example embodiment.

FIG. 8 is a flowchart illustrating a method of creating stereoscopic images when a second image is a 3D video according to at least one example embodiment.

Operation 420 may include operations 810 and 820. Operations 810 and 820 may be performed by the GPU 240.

Operations 810 and 820 may be performed when the second image is a 3D video. The 3D video may include a plurality of frames. Each frame may include images associated with a plurality of views. For example, a frame may include a left image and a right image. The frame may include an upper image and a lower image.

In operation 810, a frame of the 3D video may be segmented into two images. When the frame includes a left image and a right image, the frame may be segmented in a vertical direction. When the frame includes an upper image and a lower image, the frame may be segmented in a horizontal direction.

In operation 820, the stereoscopic images may be created by converting two images to desired (or alternatively, preset) size images. For example, the stereoscopic images may be created by rendering two images. The two images created from the frame of the 3D video may be processed in the same manner as different view images. The two images may be processed through operations 710 through 730. A method of creating stereoscopic images by converting two images may refer to the description made above with reference to FIGS. 710 through 730 of FIG. 7 and thus, a further description will be omitted.

Operations 710 through 730 of creating stereoscopic images using different view images or operations 810 and 820 of creating stereoscopic images using a 3D video may be understood as a single pipeline. Operations of creating the stereoscopic images using the different view images or the 3D video may be referred to as an image/video pipeline. The image/video pipeline and the graphics pipeline may be selectively used based on an attribute of the second image.

Figure 9:
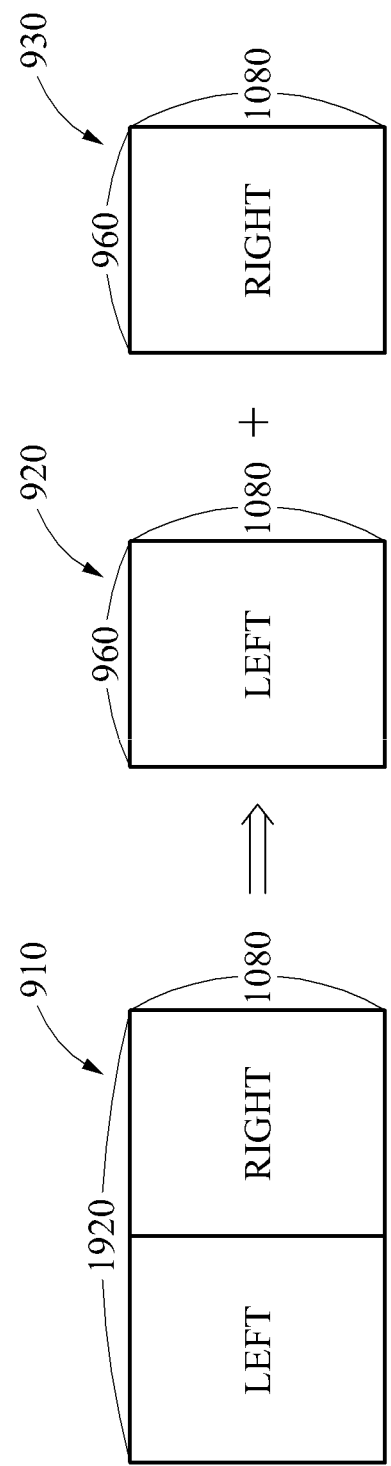
FIG. 9 illustrates an example of creating stereoscopic images when a second image is a 3D video according to at least one example embodiments.

FIG. 9 illustrates an example of creating two images when a second image is a 3D video according to at least one example embodiments.

Referring to FIG. 9, a frame 910 of the 3D video may include a left image and a right image, and may have a size of 1920×1080.

The GPU 240 may create a left image 920 and a right image 930 by segmenting the frame 910 in a vertical direction. Each of the left image 920 and the right image 930 may have a size of 960×1080. The created left image 920 and right image 930 may correspond to different view images.

Figure 10:
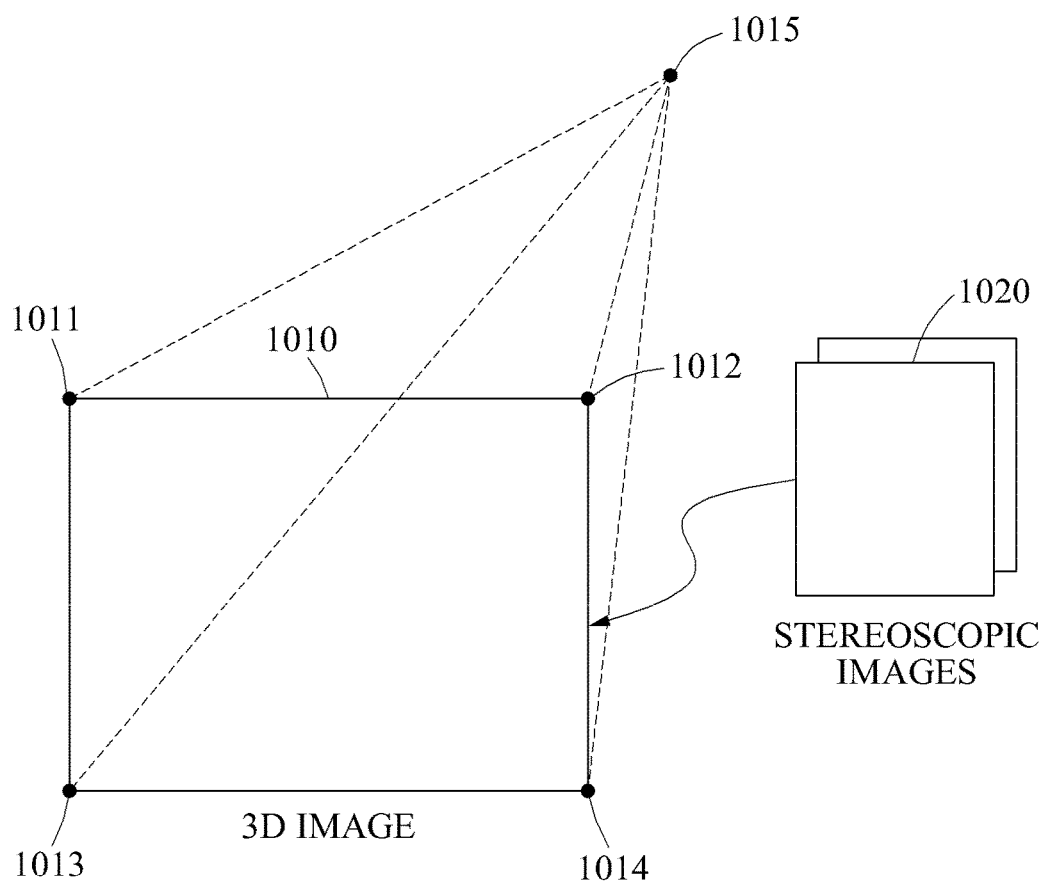
FIG. 10 illustrates a method of creating a 3D image according to at least one example embodiment.

FIG. 10 illustrates a method of creating a 3D image according to at least one example embodiment.

When operation 430 is performed by the fragment shader 320 of the GPU 240, 3D rendering may be quickly performed without using additional hardware.

The fragment shader 320 may perform 3D rendering by mapping stereoscopic images 1020 and pixel values to a single image. The fragment shader 320 may create a 3D image 1010 by performing 3D rendering using a panel of an open GL. The panel of the open GL may be created by four vertices 1011, 1012, 1013, and 1014.

The fragment shader 320 may create the 3D image 1010 by performing 3D rendering based on one or more display parameters of an external display on which the 3D image 1010 is to be displayed, and a detected eye position 1015. The detected eye position 1015 may be a position associated with both eyes of the user. For example, the detected eye position 1015 may refer to a position between both eyes of the user. The created 3D image 1010 may be three-dimensionally represented at the eye position 1015.

Figure 11:
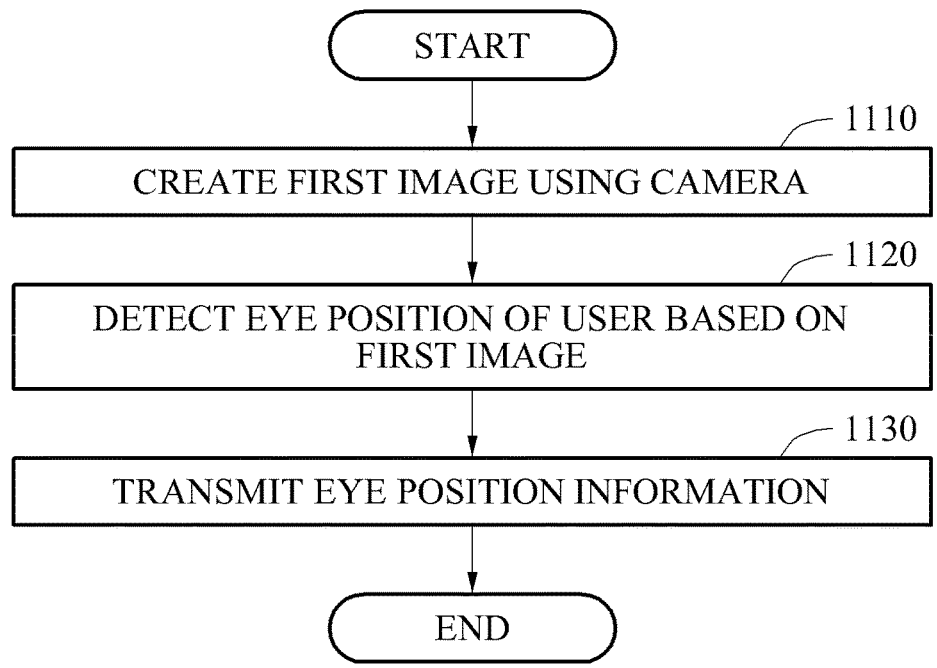
FIG. 11 is a flowchart illustrating a method of detecting an eye position of a user according to at least one example embodiment.

FIG. 11 is a flowchart illustrating a method of detecting an eye position of a user according to at least one example embodiment.

Operations 1110 through 1130 may be performed by the CPU 220 of FIG. 2 and may be performed prior to operation 410.

In operation 1110, the CPU 220 may create a first image using the camera 210 of FIG. 2.

In operation 1120, the CPU 220 may detect an eye position of a user based on the first image. For example, the CPU 220 may detect a face of the user included in the first image using a facial recognition algorithm, and may detect both eye positions of the user from the detected face.

In operation 1130, the CPU 220 may transmit the detected eye position information to the GPU 240.

Figure 12:
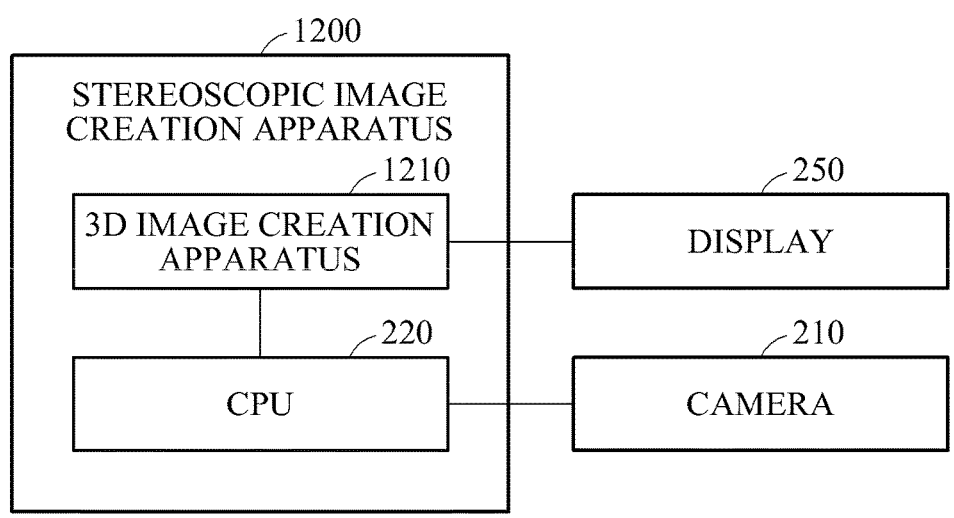
FIG. 12 is a block diagram illustrating another example of a display device according to at least one example embodiment.
Figure 13:
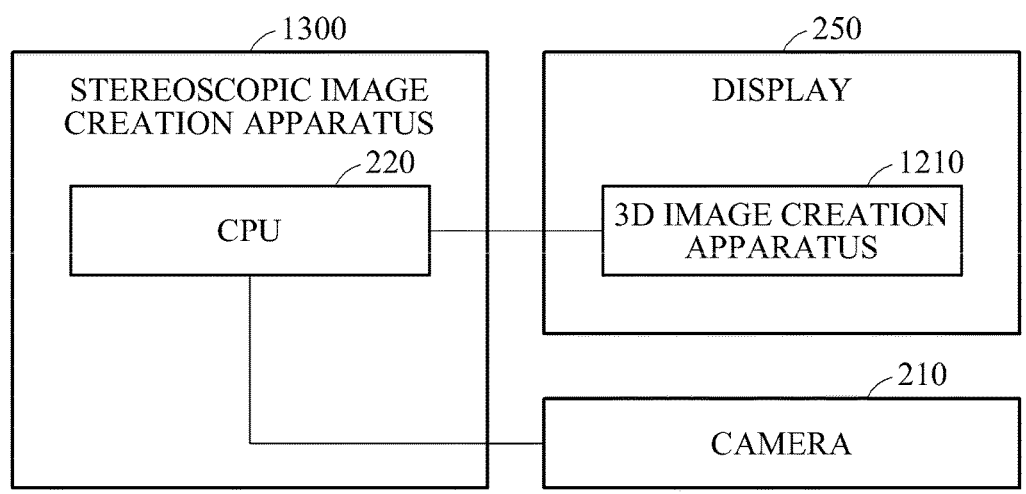
FIG. 13 is a block diagram illustrating another example of a display device according to at least one example embodiment.
Figure 14:
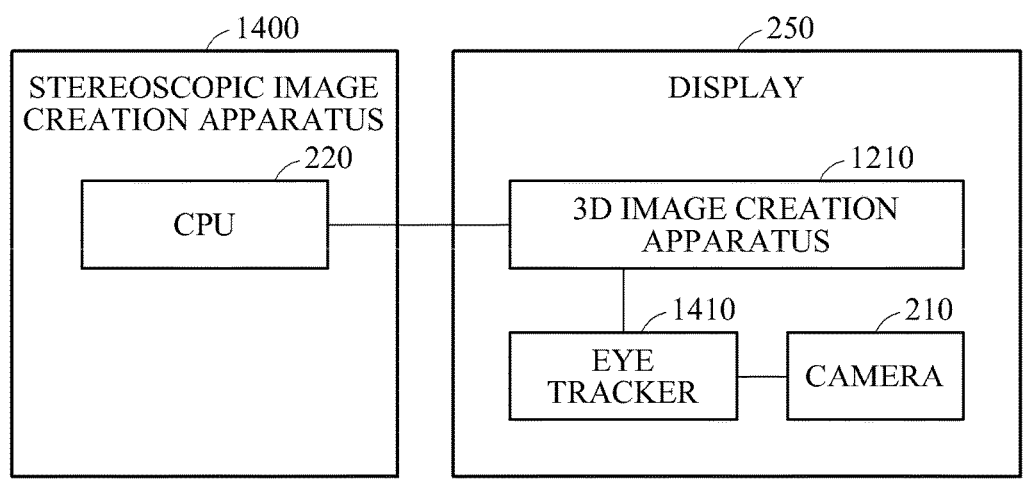
FIG. 14 is a block diagram illustrating another example of a display device according to at least one example embodiment.

Example embodiments of FIGS. 12 through 14 relate to a method of detecting and adjusting an eye position of a user. In the example embodiments of FIGS. 12 and 13, a stereoscopic image creation apparatus may detect an eye position of a user. In the example embodiments of FIG. 14, a display may detect an eye position of a user.

FIG. 12 is a block diagram illustrating another example of a display device according to at least one example embodiment.

Referring to FIG. 12, the display device 200 may include a stereoscopic image creation apparatus 1200, a display 250, and a camera 210. The stereoscopic image creation apparatus 1200 may include a 3D image creation apparatus 1210 and the CPU 220. For example, the stereoscopic image creation apparatus 1200 may be a personal computer (PC) and the display 250 may be a monitor or a television (TV). The 3D image creation apparatus 1210 may include a GPU 240.

The camera 210 may photograph a user and the CPU 220 of the stereoscopic image creation apparatus 1200 may detect an eye position of the user. The 3D image creation apparatus 1210 may acquire stereoscopic images, and may create a 3D image by performing 3D rendering based on the stereoscopic images and eye position information. The display 250 may display the rendered 3D image.

FIG. 13 is a block diagram illustrating another example of a display device according to at least one example embodiment.

Referring to FIG. 13, the display device 200 may include a stereoscopic image creation apparatus 1300, a display 250, and a camera 210. The stereoscopic image creation apparatus 1300 may include a CPU 220. For example, the stereoscopic image creation apparatus 1300 may be a PC. The display 250 may include a 3D image creation apparatus 1210, and the 3D image creation apparatus 1210 may be provided in a form of a hardware chip.

The camera 210 may photograph a user, and the CPU 220 of the stereoscopic image creation apparatus 1300 may detect an eye position of the user. The CPU 220 may create stereoscopic images. For example, the CPU 220 may create the stereoscopic images so that motion parallax may be represented based on the detected eye position information of the user. The display 250 may create and display a 3D image by performing 3D rendering using the 3D image creation apparatus 1210.

FIG. 14 is a block diagram illustrating another example of a display device according to at least one example embodiment.

Referring to FIG. 14, the display device 200 may include a stereoscopic image creation apparatus 1400 and a display 250. The stereoscopic image creation apparatus 1400 may include a CPU 220. For example, the stereoscopic image creation apparatus 1400 may be a PC. The display 250 may include a camera 210, an eye tracker 1410, and a 3D image creation apparatus 1210, and the 3D image creation apparatus 1210 may be provided in a form of a hardware chip.

The camera 210 may photograph a user, and the eye tracker 1410 may detect an eye position of the user. The CPU 220 may create stereoscopic images. The 3D image creation apparatus 1210 of the display 250 may create and display a 3D image by performing 3D rendering based on the stereoscopic images.

The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor (e.g., a special purpose processor), a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A graphics processing unit (GPU), comprising:
    a memory storing computer readable instructions; and
    a processor configured to execute the computer readable instructions to
        acquire stereoscopic images based on selectively processing a content data through a particular pipeline of a plurality of different pipelines based on an attribute of the content data, wherein the plurality of different pipelines includes a pipeline to create the stereoscopic images by setting two camera views on a graphics space, creating two images based on graphics data and the set two cameras views, and converting the two images to size images having a desired size;
        acquire eye position information from a central processing unit (CPU) connected to the GPU, the eye position information being detected from a first image including a face of a user; and
        create an executable three-dimensional (3D) image by performing 3D rendering based on the eye position information and the stereoscopic images, wherein the GPU processes the acquiring the stereoscopic images, and the creating the executable 3D image through respective independent pipelines, and the independent pipelines are operated asynchronously.

2. The GPU of claim 1, the processor further configured to execute the computer readable instructions to create the stereoscopic images based on the graphics data and motion parallax, based on a determination that the content data is the graphics data.

3. The GPU of claim 1, the processor further configured to execute the computer readable instructions to create the stereoscopic images by converting different view images to respective size images having a desired size, based on a determination that the content data includes the different view images.

4. The GPU of claim 3, the processor further configured to execute the computer readable instructions to map the different view images to respective panels within a graphics space, to set camera views corresponding to the panels on the graphics space, and to create the stereoscopic images based on the panels and the camera views.

5. The GPU of claim 1, the processor further configured to execute the computer readable instructions to create the stereoscopic images by segmenting a frame of a 3D video into two images and by converting the two images to respective size images having a desired size, based on a determination that the content data is the frame of the 3D video.

6. The GPU of claim 1, wherein the performing the 3D rendering includes mapping pixel values of the stereoscopic images to a single image.

7. The GPU of claim 1, wherein the performing the 3D rendering includes using a panel of an open graphics library.

8. The GPU of claim 1, the processor further configured to execute the computer readable instructions to perform the 3D rendering using a display parameter of an external display on which the 3D image is to be displayed.

9. The GPU of claim 1, the processor further configured to execute the computer readable instructions to buffer the 3D image and send the 3D image to an external display.

10. A three-dimensional (3D) image processing method performed at a graphics processing unit (GPU), the method comprising:
    acquiring stereoscopic images based on selectively processing a content data through a particular pipeline of a plurality of different pipelines based on an attribute of the content data, wherein the plurality of different pipelines includes a pipeline to create the stereoscopic images by setting two camera views on a graphics space, creating two images based on graphics data and the set two cameras views, and converting the two images to size images having a desired size;
    acquiring eye position information from a central processing unit (CPU), the eye position information being detected from a first image including a face of a user; and
    creating an executable 3D image by performing 3D rendering based on the eye position information and the stereoscopic images, wherein the GPU processes the acquiring the stereoscopic images, and the creating the executable 3D image through respective independent pipelines, and the independent pipelines are operated asynchronously.

11. The method of claim 10, wherein the creating a 3D image comprises:
performing the 3D rendering by mapping pixel values of the stereoscopic images to a single image.

12. The method of claim 10, further comprising:
buffering the 3D image and displaying the 3D image on an external display.

13. A three-dimensional (3D) image processing apparatus comprising:
a first processor configured to detect eye position information of a user from a first image including a face of a user; and
a second processor configured to acquire stereoscopic images based on selectively processing a content data through a particular pipeline of a plurality of different pipelines based on an attribute of the content data, wherein the plurality of different pipelines includes a pipeline to create the stereoscopic images by setting two camera views on a graphics space, creating two images based on graphics data and the set two cameras views, and converting the two images to size images having a desired size, and to create an executable 3D image by performing 3D rendering based on the eye position information and the stereoscopic images, wherein the second processor processes the acquiring the stereoscopic images, and the creating the executable 3D image through respective independent pipelines, and the independent pipelines are operated asynchronously.

14. The 3D image processing apparatus of claim 13, wherein the first processor is a central processing unit (CPU), and
the second processor is a graphics processing unit (GPU).

15. The 3D image processing apparatus of claim 13, wherein the second processor is configured to buffer the 3D image and to display the 3D image on an external display.

16. The 3D image processing apparatus of claim 13, wherein, if the content data includes different view images, the second processor is configured to create the stereoscopic images by converting the different view images to respective size images having a desired size.

* * * * *